United States Patent [19]

Amacher et al.

[11] Patent Number: 4,715,457

[45] Date of Patent: Dec. 29, 1987

[54] METHOD FOR FAST WEIGHING

[75] Inventors: Gene L. Amacher, Cambridge; Gene R. Mathes, Zanesville; John F. Paugstat, Salesville; Barry M. Mergenthaler, Cambridge, all of Ohio

[73] Assignee: NCR Corporation, Dayton, Ohio

[21] Appl. No.: 867,650

[22] Filed: May 27, 1986

[51] Int. Cl.$^4$ .................. G01G 19/52; G01G 23/14; G01G 23/10

[52] U.S. Cl. .................................. 177/1; 177/50; 177/164; 177/185

[58] Field of Search .................. 177/50, 1, 164, 165, 177/185

[56] References Cited

U.S. PATENT DOCUMENTS

| 4,044,846 | 8/1977 | Matilainen | 177/165 |
| 4,102,421 | 7/1978 | Ozaki et al. | 177/185 |
| 4,254,469 | 3/1981 | Whitely | 364/571 |
| 4,379,495 | 4/1983 | Cocks et al. | 177/1 |
| 4,413,298 | 10/1983 | Feinland et al. | 364/567 |
| 4,417,631 | 11/1983 | Johnson | 177/165 X |
| 4,442,911 | 4/1984 | Fukuda | 177/165 |
| 4,553,619 | 11/1985 | Fujinaga | 177/185 |
| 4,660,662 | 4/1987 | Katz | 177/50 |

Primary Examiner—George H. Miller, Jr.
Attorney, Agent, or Firm—Wilbert Hawk, Jr.; Albert L. Sessler, Jr.

[57] ABSTRACT

A method for fast weighing on an electronic scale is disclosed. Periodic samples are taken of the weight of an object placed upon the scale, and succeeding samples are compared for similarity within a given tolerance. The overall range of the scale is divided into various regions based upon frequency of use and reliability of readings. Fewest readings are required for that scale region of most frequent use and greatest reliability, thereby minimizing the time required for completing the weighing of objects with weights falling within that region.

16 Claims, 12 Drawing Figures

NOTE:

X - RECORDED OUTPUT FOR 0.00 LBS/KGS
Y - RECORDED OUTPUT FOR 30.00 LBS/15.00 KGS
Xi - SCALE OUTPUT FOR A GIVEN WEIGHT $$\text{NET WEIGHT, LBS.} = \frac{Xi - X}{Y - X}(30)$$

X-Y - MAJOR SCALE PARAMETERS 4,715,457

METHOD FOR FAST WEIGHING

CROSS-REFERENCE TO RELATED APPLICATIONS

Method of Calibrating a Weighing Apparatus, co-pending application, U.S. Ser. No. 868,925, filed on even date herewith, invented by Gene L. Amacher, Gene R. Mathes and John F. Paugstat, assigned to the NCR Corporation.

Automatic Zero Balancing of a Weighing Apparatus, co-pending application, U.S. Ser. No. 868,926, filed on even date herewith, invented by Gene L. Amacher, Gene R. Mathes and John F. Paugstat, assigned to NCR Corporation.

Method of Calibrating a Weighing Apparatus Within an Enclosure, co-pending application, U.S. Ser. No. 867,852, filed on even date herewith, invented by Gene L. Amacher, Gene R. Mathes and John F. Paugstat, assigned to the NCR Corporation.

Method for Controlling Terminal Display Indication, co-pending application, U.S. Serial No. 867,658, filed on even date herewith, invented by Gene L. Amacher, Gene R. Mathes and John F. Paugstat, assigned to the NCR Corporation.

BACKGROUND OF THE INVENTION

Digital scales are widely employed in supermarkets and other types of commercial establishments for the weighing of items which are being sold on a "price per unit of weight" basis. Such scales frequently constitute a part of a point-of-sale terminal system which may also include a terminal operated by a cashier and a scanner for electronically reading pricing and other information from labels on items being sold. Such terminal systems normally form part of a check-out operation at which customers queue up for paying for merchandise purchased before leaving the store. In order to keep the queues as short as possible, to minimize customer impatience, it is important that the check-out operations be completed as quickly as possible. To this end, the weighing of items on the scale forming a part of the point of sale terminal system should be accomplished as quickly as is possible without sacrificing accuracy.

SUMMARY OF THE INVENTION

This invention relates to a method for fast weighing of items on an electronic scale, and more particularly relates to such a method in which different numbers of consecutive similar weight values are required for different ranges of weight.

In accordance with one embodiment of the invention, a method for fast weighing using an electronic scale comprises the following steps: providing an electrical signal representative of the weight of an object placed upon the scale; periodically sampling said electrical signal to obtain a plurality of instantaneous analog representations of the weight of said object; digitizing said instantaneous analog representations to provide a plurality of digital values representative of the weight of said object; storing said digital values; comparing each current digital value with the immediately preceding value to determine whether said values are similar, as defined by differing by less than a predetermined amount; comparing each compared current digital value which is similar to its previous value with a zero scale balance value to determine whether said compared current value is similar to said zero scale balance value as defined by differing by less than a predetermined amount; maintaining a count of the number of values sampled; providing the most recent digital value as the desired weight following a first number of similar samplings when the weight is within a first range; and providing the most recent digital value as the desired weight following a second number of similar samplings when the weight is within a second range.

It is accordingly an object of the present invention to provide a method for fast weighing employing an electronic scale.

A further object is to provide a method for fast weighing employing an electronic scale in which different numbers of consecutive similar weight values are employed for different ranges of weight.

A further object is to provide a method for fast weighing to determine a scale zero balance.

With these and other objects, which will become apparent from the following description, in view, the invention includes certain novel features and combinations, a preferred form or embodiment of which is hereinafter described with reference to the drawings which accompany and form a part of this specification.

BRIEF DESCRIPTION OF THE DRAWINGS

FIGS. 10A to 10C inclusive together constitute a block diagram of the fast weighing process of the present invention.

DESCRIPTION OF THE PREFERRED EMBODIMENT

Figure 1:
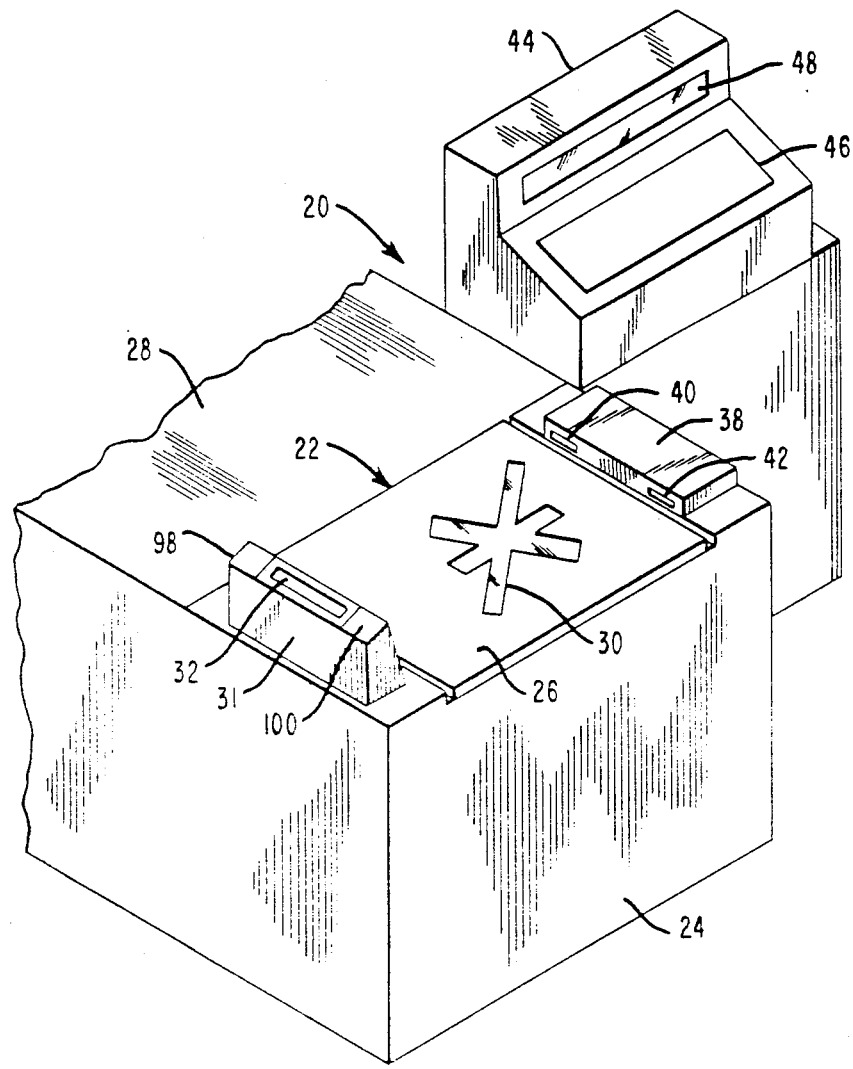
FIG. 1 is a perspective view of a check-out system which includes a scale for weighing purchased merchandise items.

Referring now to FIG. 1, there is shown a perspective view of a merchandise check-out system generally indicated by the numeral 20 in which a scale 22 is utilized to weigh a purchased item. The scale is located within a check-out counter 24 and includes a scale lid or load plate 26 movably mounted flush with the top surface 28 of the check-out counter 24. The scale lid 26 includes an aperture 30 through which scanning beams from a scanner assembly 36 (FIG. 2) mounted beneath the scale, are projected for scanning a bar code label (not shown) on a merchandise item positioned on scale lid 26 in a manner that is well known in the art.

Mounted adjacent the scale lid 26 on the surface 28 of the check-out counter 24 is a housing member 31 in which is located a customer display 32 which is an alphanumeric LCD display which displays the price of the merchandise item scanned and also the weight of the item as the result of a weighing operation. Located adjacent to either side of the display 32 within the housing 31 are a pair of signal lights 98 and 100, one red and one green, respectively, which are operated to indicate whether a weighing operation or a scanning operation was successful or not. Opposite the housing 31 on the surface 28 of the counter 24, is a housing 38 in which is located a pair of photo-electric cells 40, 42 which detect the entrance and the exit of the merchandise item on the lid 26. A pair of light emitting diodes (not shown) located in the housing member 31 directs light beams at the cells 40 and 42 in a manner that is well known in the art. Mounted adjacent the check-out counter 24 is a data terminal device 44 for processing the sales transaction which includes a keyboard 46 and a display 48. The display 32 can be operated automatically or by the manual operation of a key on the keyboard 46.

Figure 2:
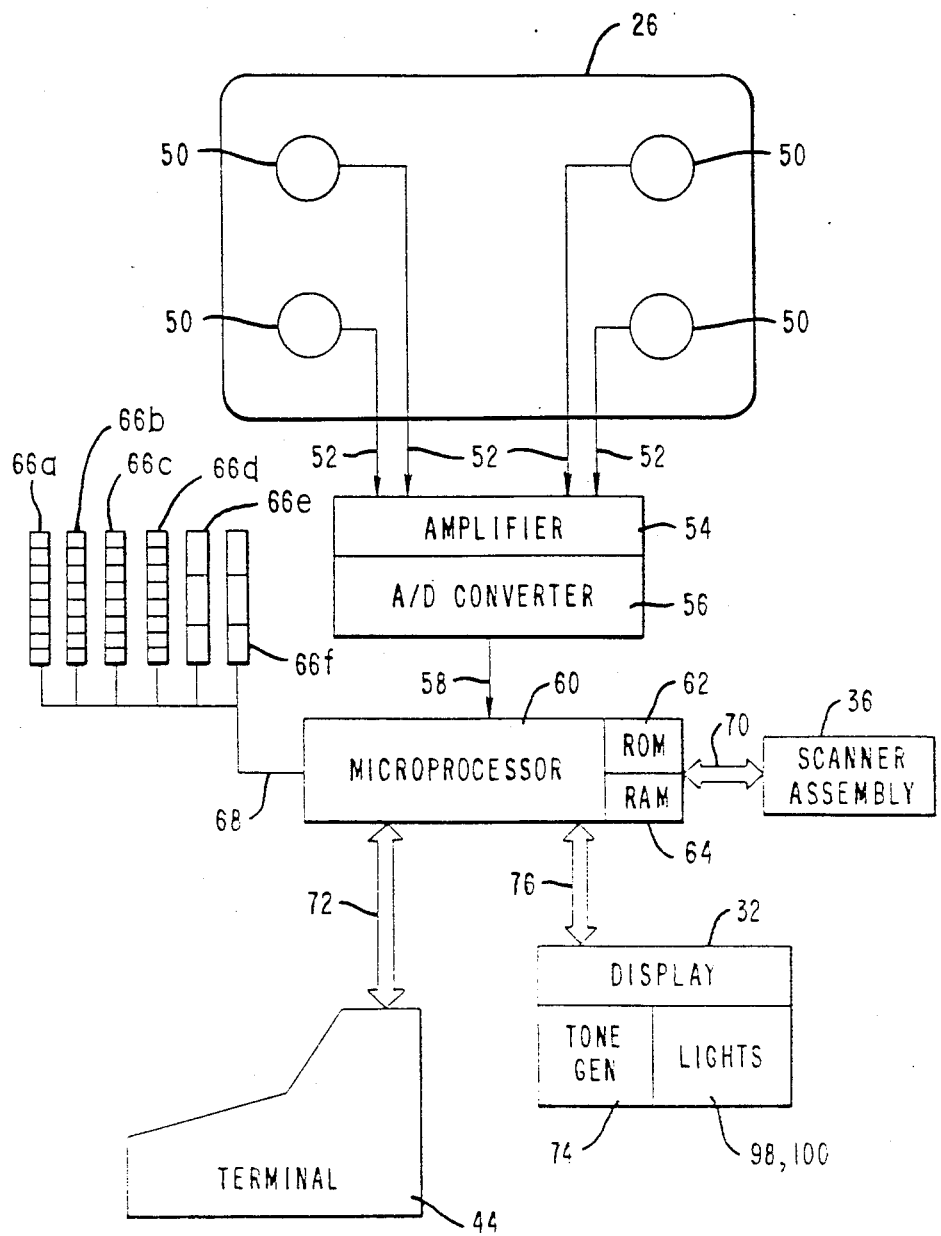
FIG. 2 is a schematic representation of the check-out system of FIG. 1 in which the scale microprocessor is used in the calibration of the scale.
Figure 4:
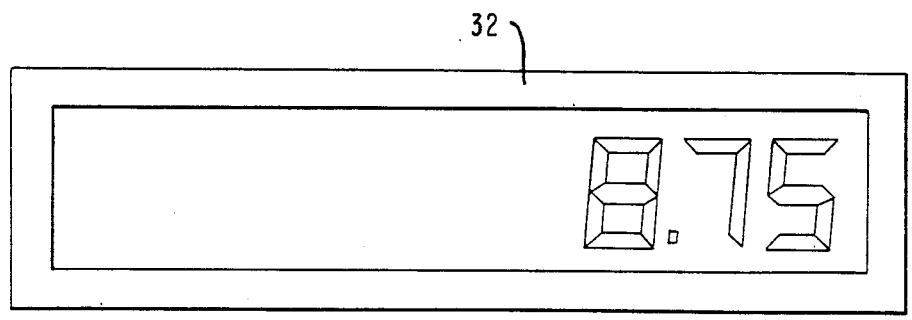
FIG. 4 is a plan view of the customer display showing the display of price information of a scanned merchandise item.
Figure 5:
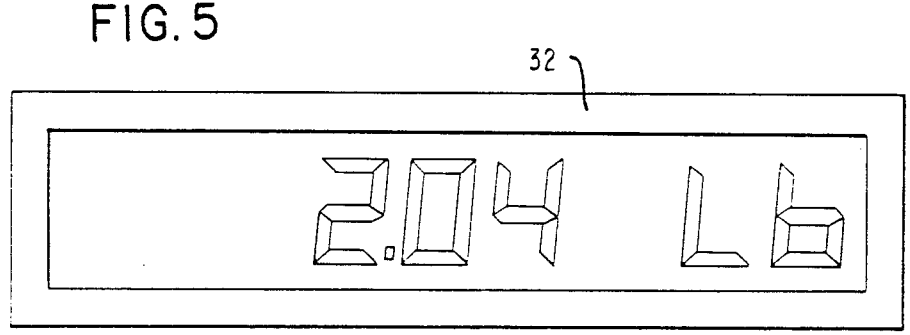
FIG. 5 is a plan view of the customer display showing the display of the weight of a purchased item.

Referring now to FIG. 2, there is shown a schematic representation of the check-out system 20 (FIG. 1) in which the scale 22 includes four load cells 50 which are secured to the scale lid 26 and which provide output analog signals over lines 52 to an amplifier 54 in response to the placing of a weighted item on the lid 26. The amplified analog signals are then transmitted to an analog-to-digital converter 56 which outputs digital signals over line 58 to a microprocessor 60 which includes a ROM memory unit 62 in which is stored the program for fast weighing and a RAM memory unit 64 in which data is stored, as will be described more fully hereinafter. The microprocessor 60 is connected to six banks of scale zeroizing and calibrating switches 66a-66f inclusive over cable 68; to the scanner assembly 36 over bus 70; to the terminal 44 over bus 72; and to the display 32, the signal lights 98, 100 and a tone generator 74, over bus 76. The microprocessor 60 monitors the operation of the scanner assembly 36 over cable 70. When the scanner is in operation, the microprocessor 60 controls the display 32 to display the item price or total sale (FIG. 4) in response to data received from the terminal 44. The microprocessor 60 will also control the display 32 to display the item weight (FIG. 5) in response to a scale operation. The microprocessor 60 further controls the signal lights 98, 100 and the tone generator 74 in response to the operation of the scanner and the scale indicating a valid or invalid operation, as will be explained more fully hereinafter.

Figure 3:
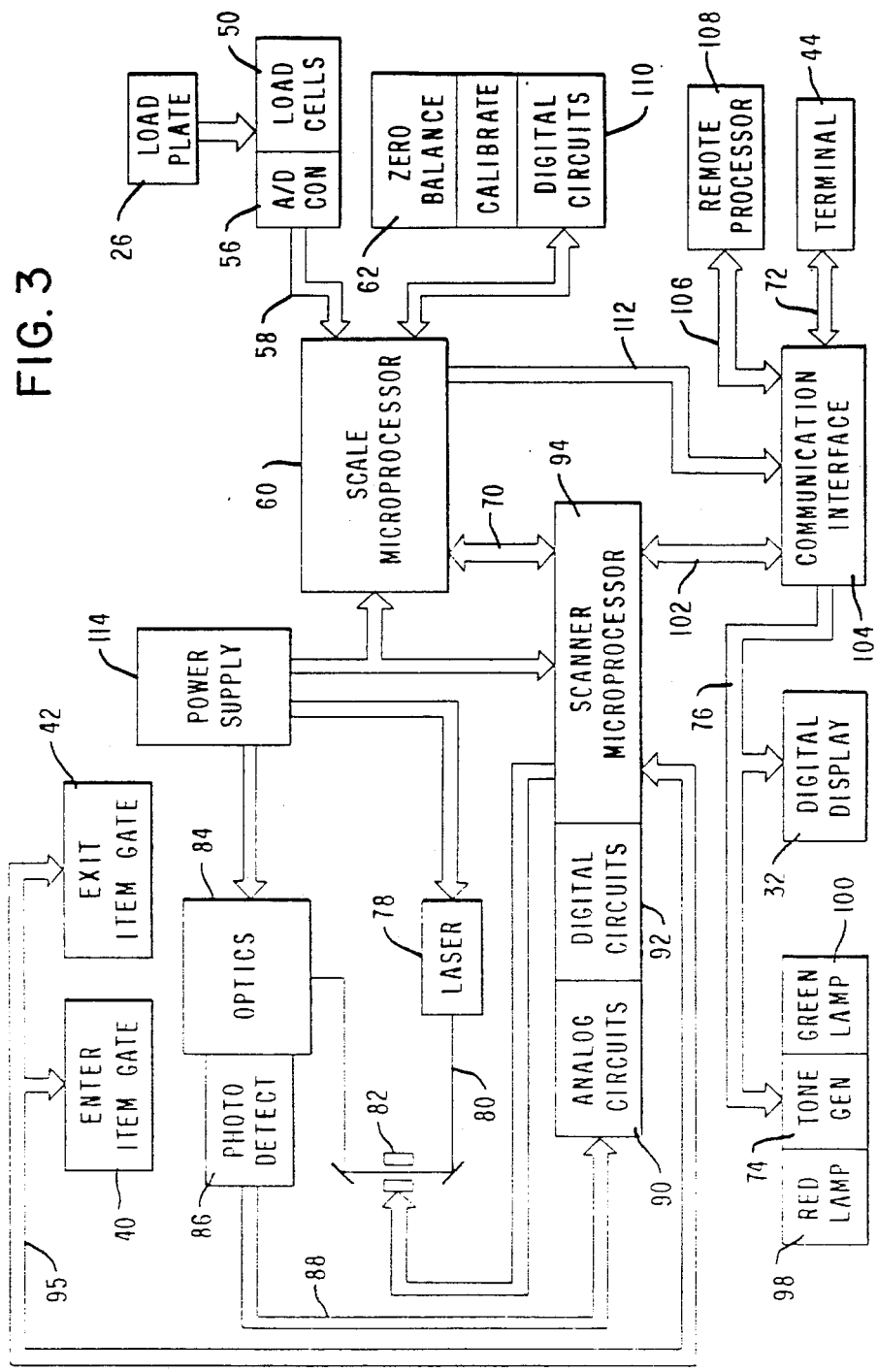
FIG. 3 is a functional block diagram of the check-out system of FIG. 1.

Referring now to FIG. 3, there is disclosed a more detailed functional block diagram of the checkout system 20 in which the scanner assembly 36 (FIG. 2) includes a laser light 78 which outputs a light beam 80 through a shutter assembly 82 to a rotating optical assembly 84 which in turn directs the reflective light beams through the aperture 30 (FIG. 1) in the scale lid 26. The scanning light beam scans the bar code label on a merchandise item positioned on the lid 26. The light beam is then reflected from the bar code label back through the aperture 30 to a photo-detector 86 which outputs an analog signal representing the coded data read over the bus 88 to the analog circuit section 90 where the signals are amplified and transferred to the digital circuit section 92. The digital circuit section 92 converts the analog signals to digital data signals. The data signals are then transferred to a scanner microprocessor 94. The microprocessor 94 also receives signals over bus 95 from the enter item gate 40 and the exit item gate 42 indicating the presence of a merchandise item. In response to receiving the signals from the item gate 40, the microprocessor operates the shutter assembly 82 allowing the laser beam to scan the merchandise item. A signal from the exit item gate 42 turns off the shutter assembly.

The microprocessor 94, using the data received, determines whether a good or bad read operation has occurred. If a bad read operation has occurred, the microprocessor 94 will output a control signal over bus 70 to the microprocessor 60, which operates the red lamp 98, by transmitting the appropriate signal over the bus 112, a communications interface 104, and bus 76 to the lamp 98. The red lamp 98 (FIGS. 1 and 3) indicates to the operator that the merchandise item should be rescanned. If a good read has occurred, the green lamp 100 (FIGS. 1 and 3) is illuminated and the tone generator 74 is operated to output a sound signal indicating to the operator that a good read has occurred. For a complete disclosure of the operation of the item gates 40, 42 and the lamps 98, 100, reference should be made to U.S. Pat. No. 4,086,476, issued to R. J. King, and assigned to the assignee of the present application.

The data signals received by the microprocessor 94 identify the merchandise item being scanned. This information is transmitted over bus 102 to the communication interface 104 which transfers the data over bus 106 to a remote processor 108. The processor 108 using this data retrieves the price of the item from a price look-up table (not shown) located within the processor and transmits the price of the item to the microprocessor 94 through the interface 104 and bus 102. The price of the item is then transmitted over bus 76 and is displayed in the customer digital display 32 and is transmitted over bus 72 to the display 48 (FIG. 1) in the terminal 44.

The scale 22 includes the load plate 26 (FIG. 1), the load cells 50 (FIG. 2), the microprocessor 60, the ROM memory unit 62 in which is stored the program to be subsequently described and a digital circuit section 110 by which the programs and the memory unit 62 interface with the microprocessor 60.

When a scale operation is required, the operator places the item to be weighed on the load plate 26 (FIG. 2) which transfers the load to the load cells 50. The cells 50 output analog signals to the amplifier 54 (FIG. 2) the A/D converter 56 (FIGS. 2 and 3) and to the microprocessor 60. The microprocessor 60 computes the weight and actuates the digital display 32 to display the weight. The weight data is also transmitted over bus 112 to the communication interface 104 which transfers the data to the terminal 44 over bus 72. The terminal obtains the price per pound data from the remote processor 108 through the interface 104 and computes the item price, prints the item price on the customer receipt, displays the item price in the terminal display 48 (FIG. 1) and transmits the item price data to the scanner microprocessor 94 which displays the price in the customer digital display 32. The microprocessor 94 will operate the green light 100 and the tone generator 74 through the microprocessor 60 if the operation is a good weighing operation and will operate the red lamp 98 if it is a bad weighing operation. Power for the system is provided by a power supply 114.

Figure 6:
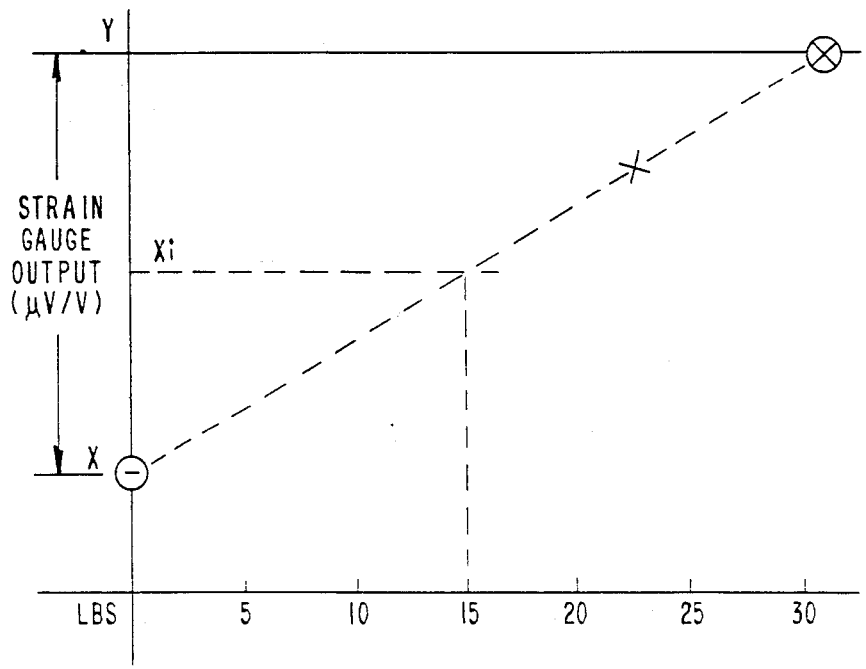
FIG. 6 is a schematic of a graph illustrating the output of the load cells of the scale in accordance with the weight placed on the scale.

Referring now specifically to the scale 22, FIG. 6 shows the relationship between the weight applied to the scale in pounds, for example, and the outputs in microvolts per applied unit voltage of the four load cells 50 on which the scale lid 26 rests. When an item to be weighed is placed upon the scale, the output of the load cells increases rapidly and then stabilizes, with the possibility of some oscillation before settling to a stabilized state, particularly in those instances in which a relatively heavy item (for example 20 pounds in the illustrated embodiment) is being weighed. When a heavy item is being weighed, the magnitude of the output of the load cell is such that any spurious signal (or "noise") in the system can readily be filtered out of the weight detection system. On the other hand, when a relatively light item is being weighed, the likelihood of oscillation of the load cell output under the influence of the weight of the item on the lid 26 is much less than with a heavy object, but the system "noise" may be a problem, due to the lower level of the output from the load cells.

Figure 8:
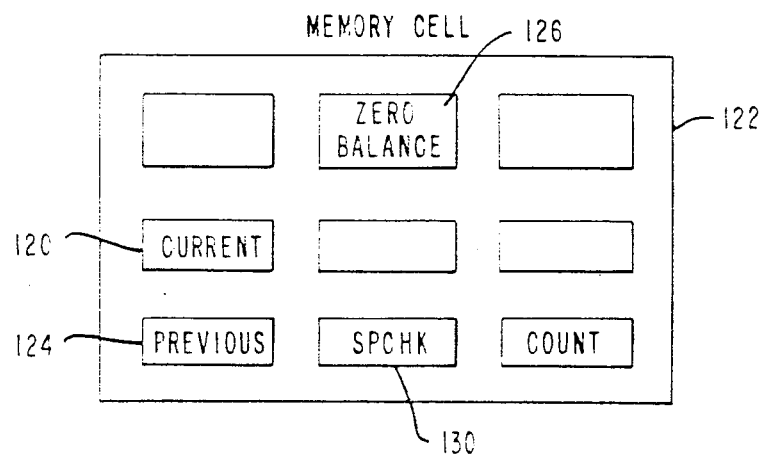
FIG. 8 is a diagram of the RAM memory unit showing various memory locations which are employed in the present invention.

The outputs of the load cells 50 are amplified by the amplifier 54 (FIG. 2), converted to digital values by the A/D converter 56, and stored in a memory location 120 (FIG. 8) designated "current", in a memory 122 associated with the microprocessor 60. When the next reading is received, it is placed in the "current" location 120, and the information previously contained in location 120 is transferred to a second location 124, designated "previous". Other locations of interest in the memory 122, which will be described subsequently in greater detail, include "zero balance" 126, "count" 128, and "special check" (or "SPCHK") 130.

Figure 7:
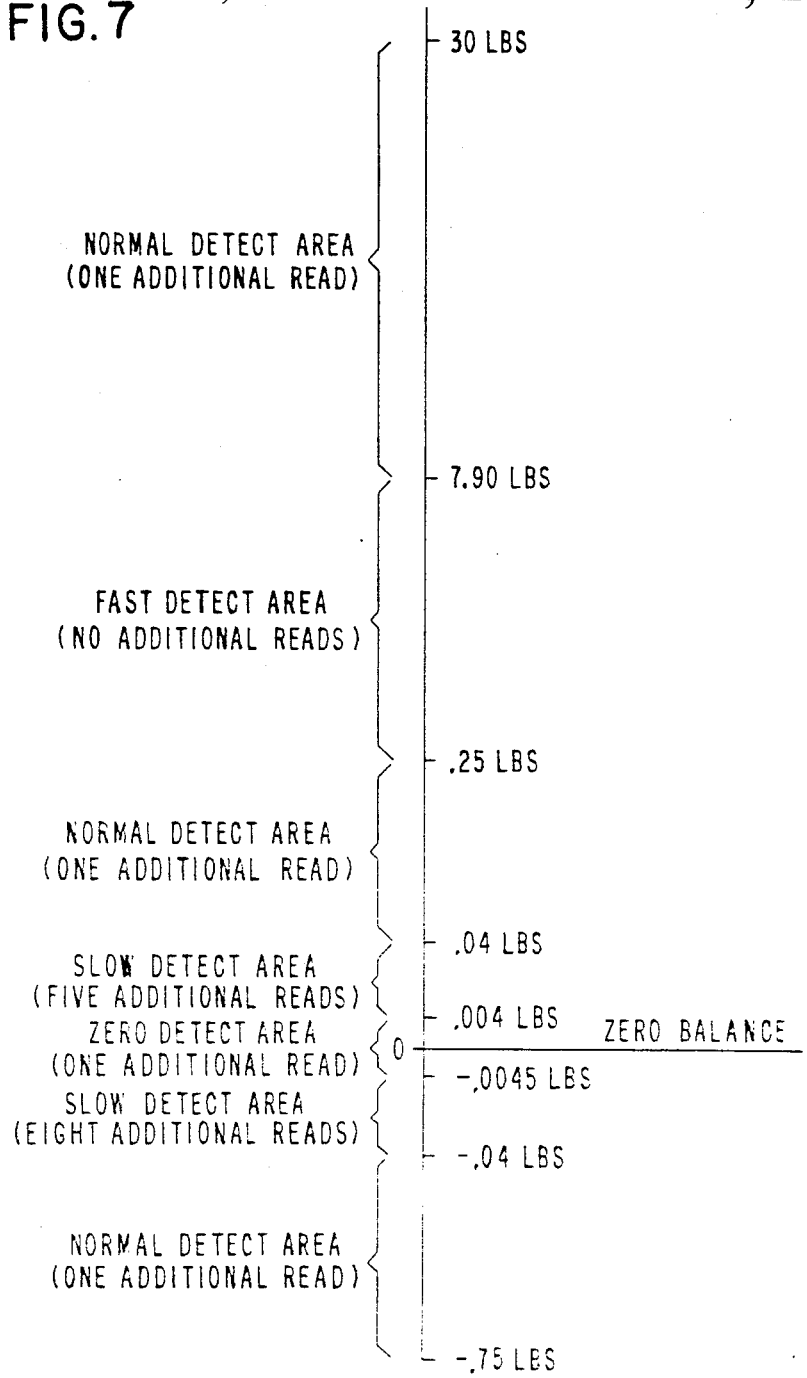
FIG. 7 is a diagram showing the number of consecutive similar weight readings required for various ranges of weights which may be weighed by the scale.

Due to the previously mentioned oscillations and noise considerations which are more significant in certain ranges of the scale 22 than in others, differing requirements for the number of successive "reads" of an item being weighed are present over the full range in which the scale 22 may function. As will subsequently be described in greater detail, consecutive readings of the scale are compared, and when a sufficiently small degree of difference between successive readings is noted, that reading or a subsequent one may be selected as the weight of the object being weighed. The diagram of FIG. 7 shows various ranges or regions of weights within the overall range of weighing for which the scale 22 is designed in the illustrated embodiment, and shows the number of additional readings required for each range after the requisite comparison between readings has been met. It will be noted that negative ranges (less than zero pounds or kilograms) are also shown. Negative readings of the scale may be obtained on occasion from improper calibration or other causes, and a negative range is included in the diagram.

Figure 10A:
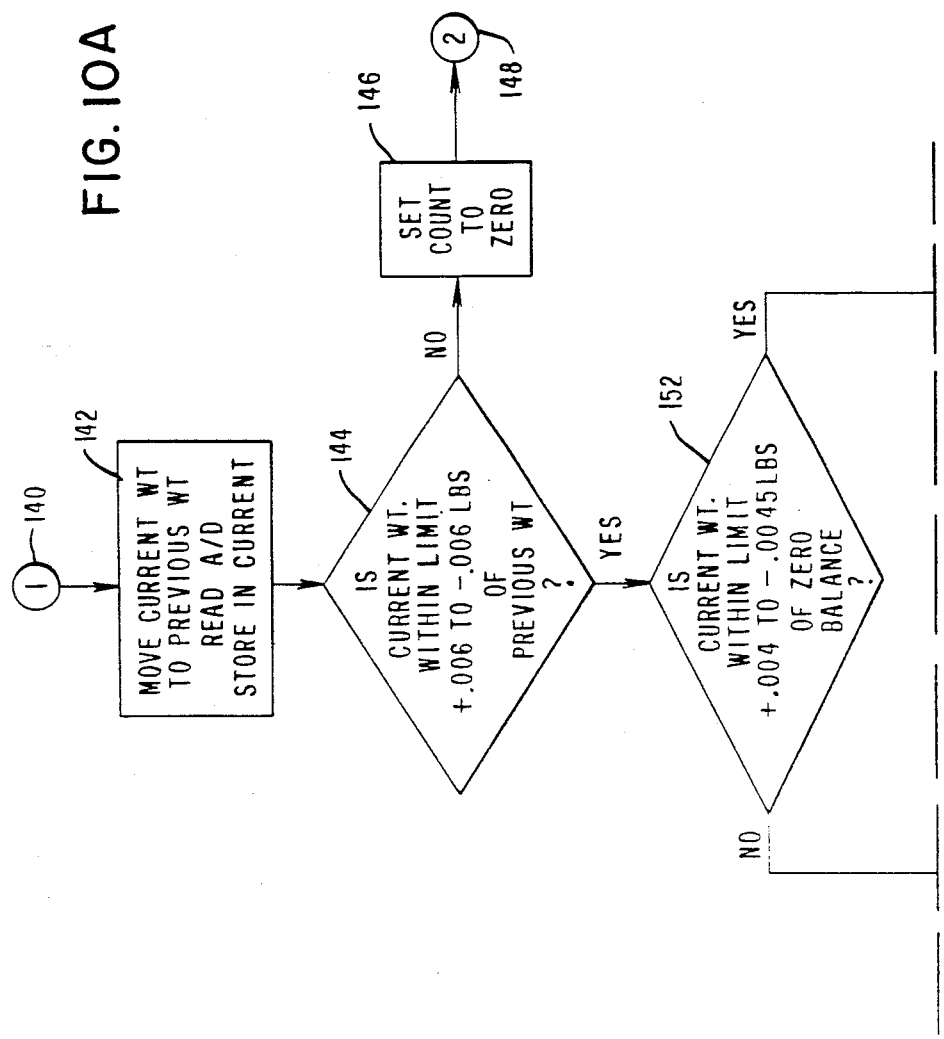
FIGS. 10A, 10B, and 10C are assembled.
Figure 9:
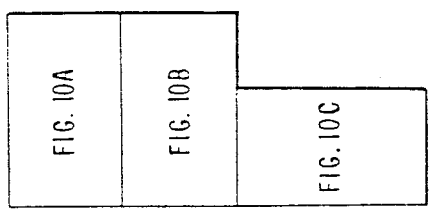
FIG. 9 is a diagram showing how
Figure 10B:
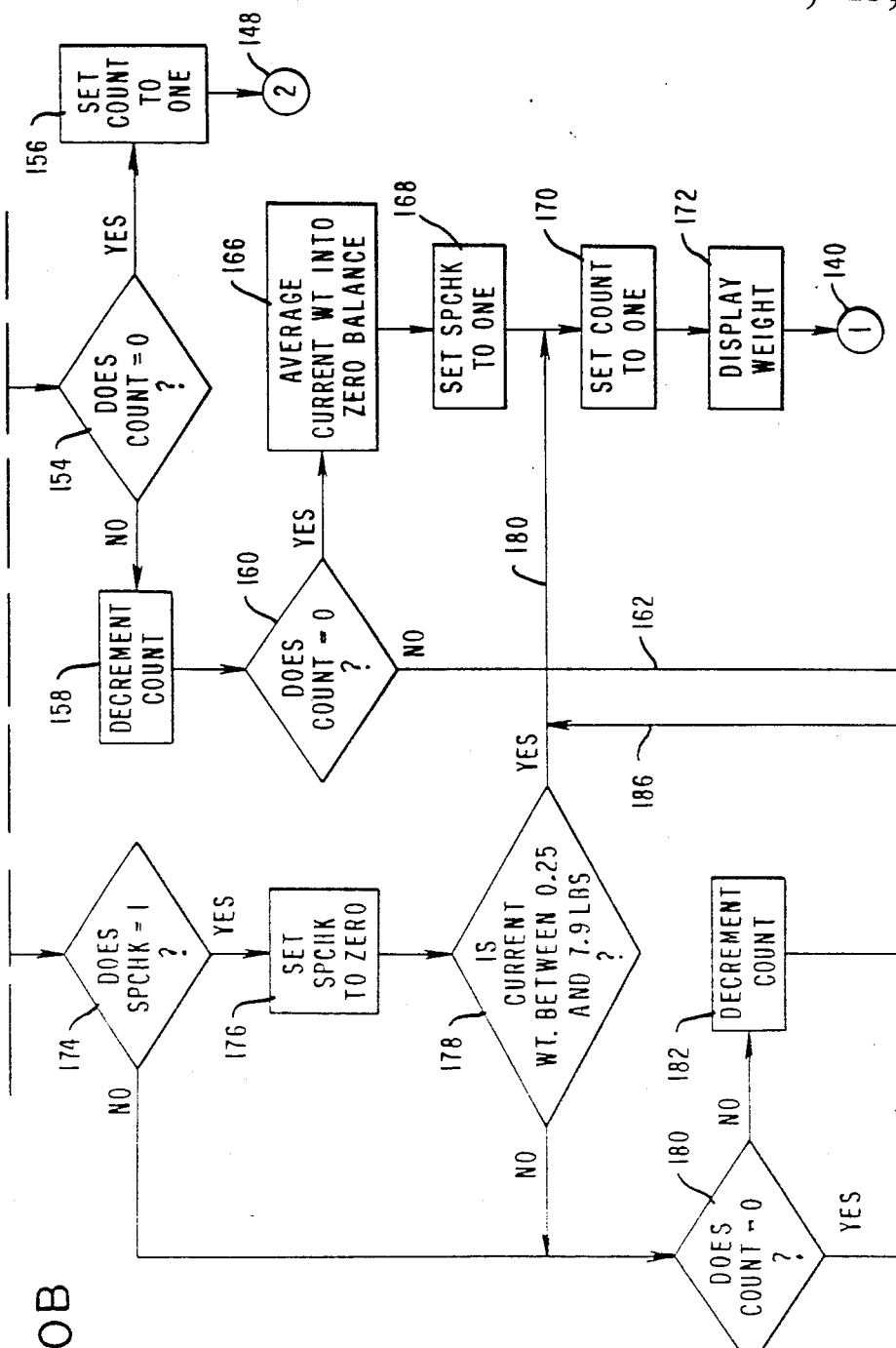
Figure 10C:
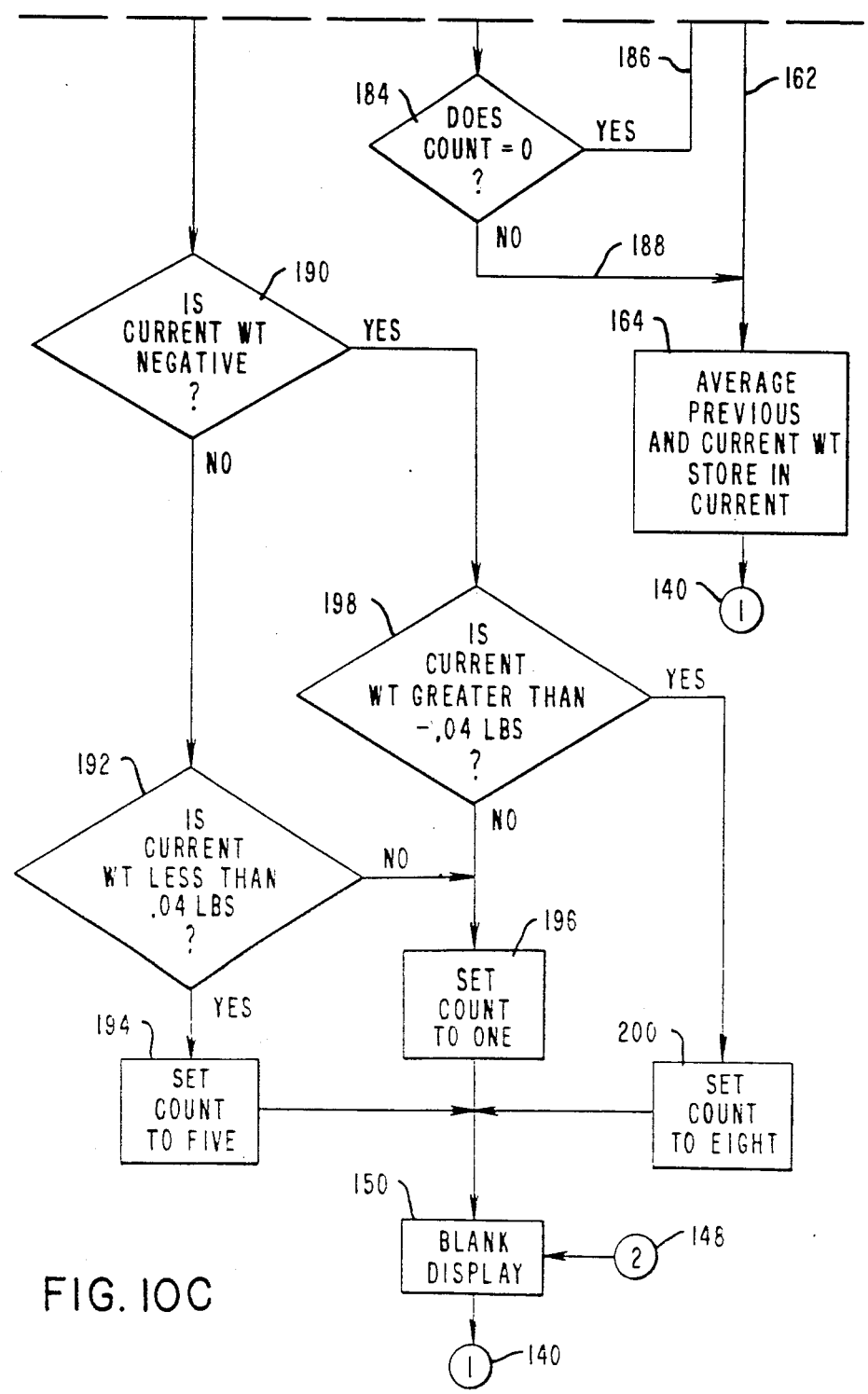

FIGS. 10A, 10B and 10C, taken together, constitute a flow diagram of the weighing process of the present invention. FIG. 9 shows the manner in which FIGS. 10A, 10B and 10C should be assembled. Referring now to FIG. 10A, the process may be considered to commence at the encircled "1" symbol 140. At this time, the weight value stored in the "current" memory location 120 (FIG. 8) is transferred to the "previous" location 122 and the weight value in the A/D converter 56 (FIG. 2) is stored in the "current" location 120, all as indicated in block 142.

A comparison is then made by the microprocessor 60 to determine whether or not the current weight value is within a limit of plus or minus 0.006 pounds of the previous weight value, as represented by block 144.

If the current weight value is not within the prescribed amount of the previous weight value, this indicates that the scale 22 has not yet stabilized, and that another sampling must be made. Accordingly, the count of the number of samplings is set to zero (block 146) and the process continues, as represented by the circled "2" symbol 148, to blank out the display 32, as represented by block 150 (FIG. 10C) after which the process returns through the circled "1" symbol 140 to the block 142.

If the current weight value is within a predetermined amount of the previous value, this indicates that a steady state of weighing has been achieved by stabilization of the scale 22. A comparison is then made, as represented in block 152, to ascertain whether the current weight value is within a prescribed limit of plus 0.004 pounds or minus 0.0045 pounds of the zero balance value of the scale. It will be recalled that the zero balance value is stored in location 126 (FIG. 8) of the memory 122.

The tolerances of plus 0.004 pounds and minus 0.0045 pounds are based upon United States Bureau of Standards requirements, but have been tightened somewhat to take account of voltage swings which may occur in the measuring of the weight.

If the current weight value is within the prescribed limits as compared to the zero balance, a check is next made (block 154, FIG. 10B) to determine if the count, as maintained in memory location 128, is zero. If "yes", this indicates that this is the first weight value that has been obtained. The count is then set to "one" (block 156) and the process continues over circled "2" symbol 148, blanking of the screen in block 150 (FIG. 10C), and return to the beginning of the process over the circled "1" symbol 140.

If there is a determination in block 154 that the count is not zero, the count is then decremented in block 158, and again is checked in block 160 to determine whether it is now zero. If the count is not zero, the process proceeds along path 162 to block 164 (FIG. 10C), in which the previous weight value and the current weight value are averaged, and the result is stored in the "current" memory location 120. The process then returns over the circled "1" symbol 140 to the beginning.

If a determination is made in block 160 that the count equals zero, the current weight is then averaged with the zero balance, as represented by block 166, and the result is stored in the "zero balance" memory location 126. Next a special check flag ("SPCHK") is set to a "one" condition, as represented in block 168. The manner in which this special check flag is used will subsequently be described. Following this, the count is set to one, as represented in block 170, and the weight is numerically displayed on the display, as represented by block 172, after which the process is returned to its initial state, as represented by the circled "1" symbol 140. This sequence continues as long as the weight is essentially zero. As soon as a weight is placed upon the scale, the current weight reading changes and the determination made by the decision block 144 (FIG. 12A) is "no". The count is set to zero (block 146) and the screen is blanked (block 150). So long as the current weight value continues to change, the display is kept blank.

When the weighing operation steadies and the most recent reading falls within the tolerance limits set forth in block 144, the process proceeds to the decision block 152, as to whether the current weight is within a given limit of the zero balance. Since a weight is now on the scale, the determination made by the decision block 152 is "no". The process then proceeds to block 174, in which an inquiry is made as to whether the special check flag is in condition one. Since in the operation being described, the system previously came from a zero balance reading, rather than from some other and different weight, the special check flag is set to one. The process then continues by setting the special check flag back to zero, as represented by block 176, and proceeding to decision block 178, in which a determination is made as to whether or not the current weight value is between 0.25 pound and 7.9 pounds.

The range of 0.25 pound to 7.9 pounds is the "fast detect" range; that is, the range in which a fast reading is desired in order to optimize the speed of the merchandise check-out operation, and also the range in which the scale 22 can be expected to be most accurate without requiring additional readings and comparisons. Consequently, if the current weight value is determined in block 178 to be between 0.25 and 7.9 pounds, the process proceeds over path 180 to set the count to one (block 170) and to display the weight (block 172), after which it returns over the circled "1" symbol 140 to the beginning of the process.

For the next current weight value reading, the path described above is followed to block 174, in which the SPCHK flag is checked. Since this flag was set to zero during the previous operation, the "no" path from block 174 is taken, to decision block 180, in which a determination is made as to whether or not the count is zero. If the weight remains steady, the count will not equal zero, and the process will move to block 182, in which the count will be decremented, and then to decision block 184 (FIG. 10C) in which an inquiry is made as to whether the count is equal to zero. If so, the path 186 is followed to the path 180, to block 170, in which the count is set to one, and to block 172, in which the weight is displayed, and thence via the circled "1" symbol 140, back to the beginning of the process. This will continue for so long as the weight on the scale remains the same.

If the count does not equal zero, the process proceeds over path 188 from the block 184 to the block 164, in which the previous value and current value are averaged and the result is stored in the "current" memory location 120. The process then reverts over circled "1" symbol 140 to the beginning of the process.

When the weight on the scale changes, this is reflected in the comparison made in block 144, which results in a "no", so that the process proceeds to block 146, in which the count is set to zero, then over symbol 148 to block 150 in which the display is blanked, and then back to the beginning via symbol 140. When a second current reading within the established limits of the first reading is received, a stable condition has again been reached, and the "yes" branch from block 144 carries the process to block 152. The process takes the "no" branch from block 152 since there is weight on the scale. The process proceeds to block 174, where the "no" branch is taken, since the special check flag is set to zero, and further proceeds to block 180. The count does equal zero, since it was so set while the weight on the scale was changing.

The process consequently proceeds to the block 190, where a check is made as to whether the current weight is negative. If not, a check is made at block 192 to determine whether the current weight is less than 0.04 pound. If so, the count is set at five in block 194, the display is blanked at block 150, and the process is returned to the beginning over symbol 140. It will be noted that this is a scale range in which noise problems may exist, so that the additional readings are desirable.

If the current weight is not less than 0.04 pound, the count is set to one in block 196, the display is blanked at block 150, and the process is returned to the beginning over symbol 140. In this area of the scale range, from 0.04 pound to 0.25 pound, noise is not so much of a factor as in the lower positive range, and one additional reading is considered to be sufficient.

If the current weight value is determined to be negative in block 190, the process proceeds to block 198, where a further determination is made as to whether the negative weight is greater than minus 0.04 pounds. If not, the process proceeds to block 196 where the count is set to one, and thence to block 150 where the display is blanked, and then is returned via symbol 140 to the beginning of the process. If the negative weight is greater than minus 0.04 pounds, the process proceeds to block 200, where the count is set to eight, and thence to block 150 for blanking of the display, and return via symbol 140. It will be noted that the eight additional readings are deemed appropriate in the case of a negative reading very close to the zero balance, since such reading indicates inaccuracy, as for example from an air current striking the scale, or a vibration of the scale, and a number of readings should be provided to enable what may be a transient condition to terminate.

It will be seen that a process has been provided in which a fast reading of weight is accomplished by the scale within the range in which most items purchased by a customer normally fall, and in which a larger numter of individual samplings are required to make a weight reading in those operating ranges of the scale in which inaccuracies are more likely, and within which the weights of relatively fewer customer purchases are likely to fall.

While the form of the invention illustrated and described herein is particularly adapted to fulfill the objects aforesaid, it is to be understood that other and further modifications within the scope of the appended claims may be made without departing from the spirit of the invention.

What is claimed is:

1. A method for fast weighing using an electronic scale, comprising the following steps:
   providing an electrical signal representative of the weight of an object placed upon the scale;
   periodically sampling said electrical signal to obtain a plurality of instantaneous analog representations of the weight of said object;
   digitizing said instantaneous analog representations to provide a plurality of digital values representative of the weight of said object;
   storing said digital values;
   comparing each current digital value with the immediately preceding value to determine whether said values are similar, as defined by differing by less than a predetermined amount;
   comparing each compared current digital value which is similar to its previous value with a zero scale balance value to determine whether said compared current value is similar to said zero scale balance value as defined by differing by less than a predetermined count;
   maintaining a count of the number of values sampled;
   providing the most recent digital value which is not similar to a zero scale balance value as the desired weight when the weight is within a first range; and providing the most recent digital value as the desired weight following a first number of similar samplings when the weight is within a second range.

2. The method of claim 1, also including the step of displaying the provided weight on a display.

3. The method of claim 2 in which the display is maintained in blank condition until the weight is provided.

4. The method of claim 1, also including the step of averaging the most recent digital value with a previous zero scale balance value and providing the result as a zero scale balance following a predetermined number of similar samplings when the current digital value is similar to said previous zero scale balance value.

5. The method of claim 4, also including the step of displaying the provided zero scale balance on a display.

6. The method of claim 5 in which the display is maintained in blank condition until the zero scale balance is provided.

7. The method of claim 4, also including the steps of activating a flag when a zero scale balance is provided; and conditioning the providing of the desired weight only when said flag is activated.

8. The method of claim 1 in which the step of comparing each current digital value with the immediately preceding value continues until a determination is made that said values are similar.

9. The method of claim 1, also including the step of providing the most recent digital value as the desired weight following a second number of similar samplings when the weight is within a third range.

10. The method of claim 9, also including the step of displaying the provided weight on a display.

11. The method of claim 10 in which the display is maintained in blank condition until the weight is provided.

12. The method of claim 9, also including the step of providing the most recent digital value as the desired weight following a third number of similar samplings when the weight is a negative value.

13. The method of claim 11 in which the display is maintained in blank condition until the weight is provided.

14. A method for fast weighing using an electronic scale, comprising the following steps:
prov255ing an electrical signal representative of the weight on the scale;
periodically sampling said electrical signal to obtain a plurality of instantaneous analog representations of the weight on the scale;
digitizing said instantaneous analog representations to provide a plurality of digital values representative of the weight on the scale;
storing said digital values;
comparing each current digital value with the immediately preceding value to determine whether said values are similar, as defined by differing by less than a predetermined amount;
comparing each compared current digital value which is similar to its previous value with a stored zero scale balance value to determine whether said compared current value is similar to said zero scale balance value as defined by differing by less than a predetermined amount;
maintaining a count of the number of values sampled;
averaging the most recent digital value with a previous zero scale balance value; and
providing the result of said averaging as a zero scale balance following a predetermined number of similar samplings when the current digital value is similar to said previous zero scale balance value.

15. The method of claim 14, also including the steps of displaying the provided zero scale balance on a display.

16. The method of claim 15 in which the display is maintained in blank condition until the zero scale balance is provided.

* * * * *